United States Patent
Wand

[19]

[11] Patent Number: 6,107,787
[45] Date of Patent: Aug. 22, 2000

[54] AUTOMOBILE DASHBOARD LIGHT CONTROL

[75] Inventor: Thomas J. Wand, Canton, Mich.

[73] Assignee: Methode Electronics, Inc., Chicago, Ill.

[21] Appl. No.: 09/182,708

[22] Filed: Oct. 29, 1998

[51] Int. Cl.⁷ .................................................. G05F 5/00
[52] U.S. Cl. ........................... 323/299; 323/351; 323/905
[58] Field of Search .................................. 323/282, 288, 323/351, 905, 299

[56] References Cited

U.S. PATENT DOCUMENTS

| | | | |
|---|---|---|---|
| 4,325,021 | 4/1982 | McMackin | 323/351 |
| 4,772,995 | 9/1988 | Gautherin et al. | 323/288 |
| 5,514,947 | 5/1996 | Berg | 323/282 |
| 5,519,598 | 5/1996 | Sakai et al. | 323/351 |
| 5,572,112 | 11/1996 | Saeki et al. | 323/282 |
| 5,818,207 | 10/1998 | Hwang | 323/288 |
| 5,847,554 | 12/1998 | Wilcox | 323/282 |
| 5,949,224 | 9/1999 | Barkaro | 323/351 |

*Primary Examiner*—Jeffrey Sterrett
*Attorney, Agent, or Firm*—Steven M. Evans; David L. Newman

[57] ABSTRACT

Dashboard dimmer light circuit for a vehicle, for example a car or truck. A power supply 10 provides a step-function voltage signal to an op-amp oscillator circuit 20 which provides a triangular voltage oscillation signal to an op-amp level comparator 40 which, in turn, compares the triangular voltage oscillation signal to a voltage reference for providing a pulse-width-modulated (PWM) voltage signal to a power FET driver 70 which, in turn, responds to the pulse-width-modulated voltage signal by providing a current signal to an automobile dashboard dimmer light 80. Features of the invention include a) a dashboard dimmer light having a stable oscillator frequency, b) PWM duty cycle stability in a dashboard dimmer light, c) efficient accomplishment of the invention's oscillator and level comparator functions within a single IC, d) reduction of electromagnetic interference which might otherwise intefere with other electronic equipment in the dashboard.

9 Claims, 1 Drawing Sheet

AUTOMOBILE DASHBOARD LIGHT CONTROL

TECHNICAL FIELD

The present invention relates to circuits for controlling power to an automobile dashboard dimmer light and, in particular, minimizing the use of power by that dashboard light.

BACKGROUND OF THE INVENTION

The operation of computers and other electronic equipment is accompanied by unwanted electromagnetic interference (known simply as 'noise' by electrical engineers). Electromagnetic interference (EMI) generated from a given device can be communicated back to that device. Moreover, the radiation emitted from one or more separate but adjacent devices can combine synergistically to create still more noise. As the number of electronic parts in an automobile increases so does the amount of electromagnetic interference (EMI) ambient in the automobile.

Further, the tendency to make electronic equipment smaller causes an increase in the density of radiation-emitting devices and the proximity of such devices to one another, thereby augmenting the effects of EMI on surrounding circuitry. Additionally, the recent exponential increase in the number of wireless communications devices increases the amount of ambient EMI in modem autos.

These pressures underscore the importance of EMI suppression in electronic designs in an auto. The issue is all the more important in the dashboard of a modern automobile where numerous electrical and electronic components are located in confined quarters and, usually, near an automobile engine. For the automobile passengers, the issue is poignant because it can affect the performance of audio equipment they listen to while driving.

Another problem in the design of electronic modules is maintaining the stability of oscillator frequency of the electronic module. Prior dashboard light circuits control current to auto dashboard dimmer lights using a rheostat, but the heat generated by the rheostat is substantial and limits the life of the dashboard light as well as heat-sensitive plastics in and around the dashboard. In more recent dashboard dimmer light circuits, a pulse-width-modulated (PWM) signal limits the on-time of a dashboard dimmer light to reduce the average power consumption of the dashboard dimmer light in proportion to the duty cycle of the PWM signal. These designs vary the duty cycle through a step-wise bank of discrete resistors, they affect the frequency of the PWM signal. This, in turn, can affect the EMI and therefore the radio, cell phone, etc.

SUMMARY OF THE INVENTION

It is an object of the present invention to solve the above problems and minimize power dissipated by an automotive dashboard dimmer light control circuit.

According to the present invention, a power supply provides a step-function voltage signal to an op-amp oscillator circuit which provides a triangular voltage oscillation signal to an op-amp level comparator which, in turn, compares the triangular voltage oscillation signal to a voltage reference for providing a pulse-width-modulated (PWM) voltage signal to a power FET which, in turn, responds to the pulse-width-modulated voltage signal thereby providing a reduction in the time-averaged current signal to an automobile dashboard light.

Features of the invention include a dashboard dimmer light having a stable oscillator frequency.

A second feature is PWM duty cycle stability in a dashboard dimmer light.

A third feature is efficient accomplishment of the invention's oscillator and level comparator functions within a single IC.

A fourth feature is the addition of a capacitor on a power driver FET of the dashboard dimmer light for controlling the current to the dashboard light. This is an alternative to variable and undefined uses of the gate capacitance of the FET to control that current and RF emissions resulting from the dashboard light circuit of the present invention. The invention slows the on/off switching speed of that power driver FET for limiting and reducing RF emissions created by FET switching.

The aforementioned oscillator frequency stability is due to the invention using a fixed oscillator to set the frequency and a separate means to produce the PWM signal. This in turn causes stability of the PWM duty cycle because changes in the PWM duty cycle by an automobile passenger, to vary the brightness of the dashboard light, are not influenced by variations in the oscillator frequency. Still another feature is that EMI conditions are minimized because if the oscillator frequency is changing as the PWM duty cycle is adjusted, the Fourier transform of that waveshape is less predictable and high levels of emissions can occur. This EMI improvement occurs due a) to the stability of the oscillator due to separation of the oscillation and level comparison functions, and b) to the use of an external capacitor and gate resistance to control the FET switching rates.

Other objects, features and advantages will become apparent in light of the text and drawings describing the invention.

DETAILED WRITTEN DESCRIPTION OF PRESENTLY PREFERRED EMBODIMENT OF THE INVENTION

Figure 1:
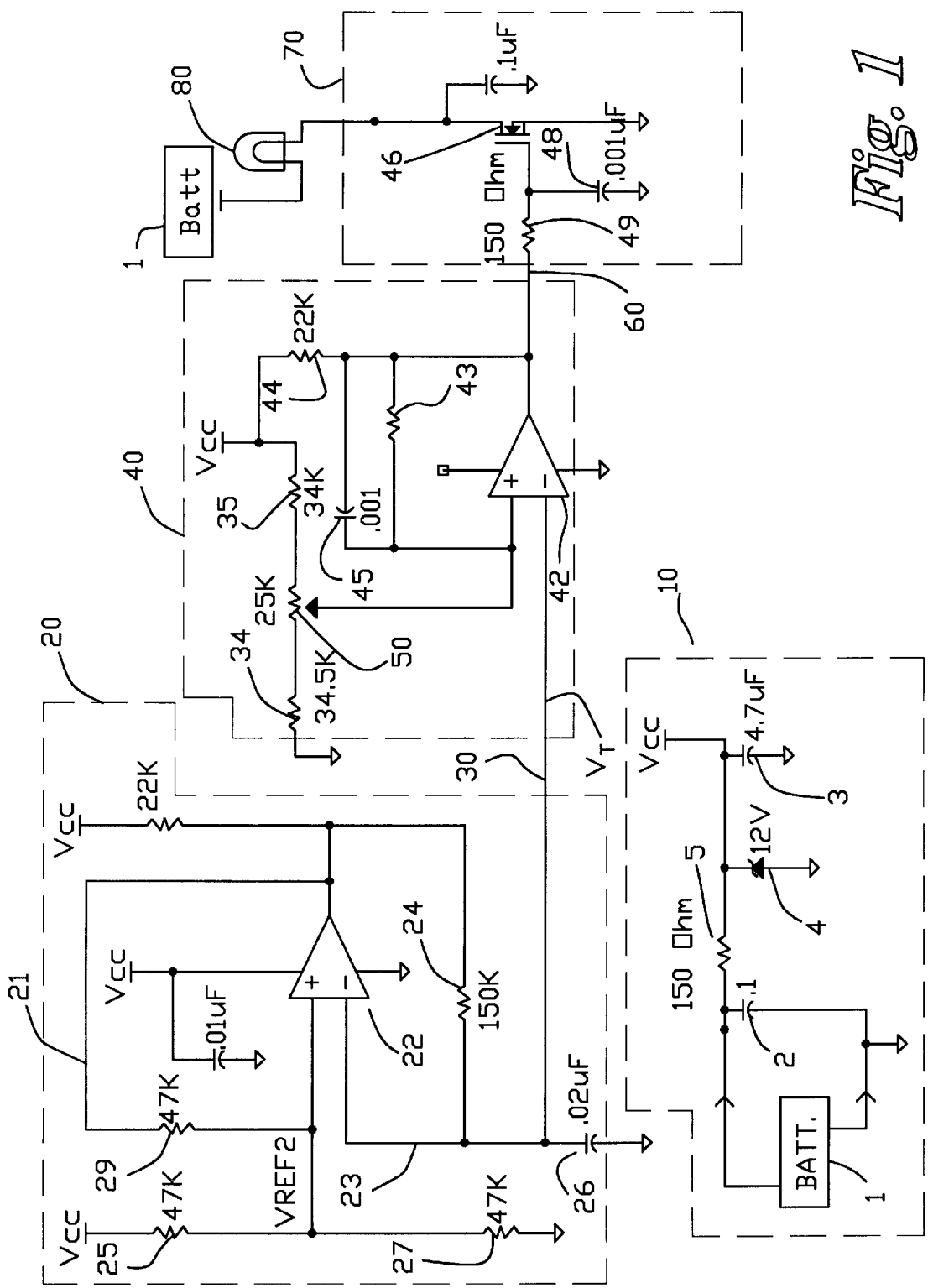
FIG. 1 is a circuit diagram of the present invention.

In FIG. 1, a power supply 10 supplies a step-function voltage signal to an oscillator 20, for producing a triangular voltage oscillation signal $V_T$ on a line 30 to a level comparator 40. The level comparator 40 compares the triangular voltage oscillation signal $V_T$ to a reference voltage $V_{REF1}$, established by the setting of a potentiometer 50, for providing a pulse-width-modulated (PWM) voltage signal on a line 60 to a power driver 70 for illuminating an auto dashboard light 80.

More specifically, power supply 10 is a simple zener-type voltage regulator including a car battery 1 (Batt.)for providing a dc voltage across capacitors 2, 3, zener diode 4, and resistor 5. This supply 10 provides a stable voltage Vcc used to excite the other circuits 20, 40, 70 and protects them from damaging or surging voltages.

Oscillator 20 includes an op-amp comparator in linear mode 22 for modulating the step function at 256 Hz with an exemplary 50% duty cycle, for making square waves of the step-function. Within the oscillator block 20 is a pairing of a resistor 24 and capacitor 26 for providing a delayed representation of the output level of op-amp 22 which is, in turn, fed back to the inverting input of op-amp. 92. This feedback signal would be logarithmic, as is typical of RC responses. However, since only the central third of this signal is used, it takes on a near linear response to produce one slope of the resulting triangle signal on line 30.

Level comparator 40 compares a reference voltage $V_{REF1}$ established by a potentiometer 50, with the triangular oscillation voltage signal $V_T$ provided on line 30 using an op-amp comparator 42 (which resides on an IC). This comparator 42 provides an output toggle upon each successive threshhold crossing of the triangle oscillation voltage signal $V_T$ and $V_{REF1}$. As comparator 42 toggles on and off it provides a logical zero to $V_{CC}$ volts representation of when the triangular oscillation voltage signal $V_T$ is above the reference voltage $V_{REF1}$, established with the potentiometer 50.

The power driver 70 converts the logical output of the level comparator block 40 to an interrupted current for controlling the average load current to dashboard light 80. Dashboard light 80 need not be a single light, but can be a collection of light sources, such as LEDs.

In more detail, the elements of the dashboard light circuit function ratiometrically with each other, and therefore the need for tight regulation of the input voltage is small. This allows for use of a simple resistor 5 and zener diode 4, to provide supply stabilization. Combining capacitor 2 and capacitor 3 live load stability, voltage spike damping, and overall transient and injected noise tolerance. A zener diode 4 voltage of 12 volts is another benefit in that under any normal operating condition the input voltage will be higher—allowing zener diode 4 to regulate the supply voltage.

Op-amp 22 is part of an oscillator 20 with positive feedback on line 21 which sets the limits of operation, and provides a delayed negative feedback on line 23, for fixing the frequency of oscillation of the voltage response of op-amp 22. A reference voltage $V_{REF2}$ for the oscillator 20 is determined by a voltage divider set up by divider resistors 25, 27. Resistor 29 feeds back on a $V_{REF2}$ 29, to produce upper and lower limits of the triangle voltage signal $V_T$ generated by op-amp 22. Series elements, resistor 24 and capacitor 26, on an inverting input of op-amp 22 determine the time constant and slope of triangular oscillation voltage signal $V_T$. Therefore, elements 24, 26 also determine the frequency of the voltage response of oscillator 20 provided on line 30 as $V_T$ to level comparator 40.

Level comparator 40 compares triangular oscillation signal $V_T$ on line 30 to a selectable reference voltage $V_{REF1}$ for providing a PWM voltage signal. The parameters of that level comparison are set by resistors 34, 35 in association with potentiometer 50. These three resistive elements together comprise a voltage divider for dividing Vcc for providing $V_{REF1}$. $V_{REF1}$ is provided to the comparator 40 for comparison to $V_T$. Whereas resistor 34 sets a lower limit set point, resistor 35 sets an upper limit, and the potentiometer 50 provides to an automobile user a means for varying the brightness of dashboard dimmer light 80.

Because the operating range of the level comparison is selected to be only the center one third of the range of the supply Vcc, there is ample range at the extremes of the selected range to ensure 0% or 100% D.C.—where it is necessary—at the noninverting input of op-amp 42. Comparator 40 compares this reference voltage $V_{REF1}$ from potentiometer 50 with the triangular voltage oscillation signal provided on the inverting input of op-amp 42. The output of op-amp 42 defines the amount of time that the magnitude of the triangular voltage oscillation signal is greater than the reference voltage $V_{REF1}$ and determines the amount of current to be delivered to the load—dashboard light 80. The PWM voltage signal on line 60 from op-amp 42 is fed back positively, after a delay determined by resistors 43, 44 and capacitor 45.

The power driver 70 uses a high current power MOSFET 46 to drive the load—dashboard dimmer light 80. MOSFET 46 is a logic level device for ensuring saturation over the wide auto battery voltage swing typical seen in the operation of an automobile. Second, MOSFET 46 is an 'E' rated MOSFET—energy rated device for over-voltage protection. Its use in the dashboard dimmer light circuit of the present invention eliminates need for a costly zener diode or MOV, which might otherwise be required to protect a current driver. Third, because MOSFET 46 is a high current FET, it eliminates heat dissipation. Within MOSFET 46 is a large die allowing MOSFET 46 to handle large currents. MOSFET 46 has a low on-resistance. The voltage drop across this low on-resistance is minimized and, therefore, so is the power dissipation in the dashboard dimmer light circuit ol the invention. Further, selection of a high current E-rated FET for MOSFET 46 eliminates the need for a heat sink, reducing the size of a package containing the circuit of the present invention. In sum, the savings of removing such a heat sink offsets the cost of the high current E-rated MOSFET 46 as compared with another FET.

Radiated and conducted RF emissions are a concern in auto electronics, especially when PWM circuits are implemented. Capacitor 48 and resistor 49 are added to driver 70 to slow the FET 46 transitions as it switches to permit control of the frequency range of the spectral emissions produced. The use of the high current FET 46 here also is a benefit in that it's large die inherently produces a high gate capacitance. In some cases this gate capacitance can accomplish the RF reduction on its own, eliminating the need for capacitor 48 to do it.

Furthermore, it should be understood that various changes and modifications to the presently preferred embodiments described herein will be apparent to those skilled in the art without departing from the spirit and scop of the present invention and without diminishing its attendant advantages. It is, therefore, intended that such changes and modifications be covered by the appended claims.

What is claimed is:

1. A low power vehicle dashboard light dimmer control circuit, comprising:

a power supply for providing a power signal in response to a voltage provided by a vehicle battery;

a triangle oscillator responsive to said power signal for providing an oscillating signal;

a level comparator, including a potentiometer, for comparing the magnitude of said oscillating signal to a voltage reference for providing a pulse-width-modulation signal, wherein the potentiometer is responsive to manual adjustment to vary the pulse-width modulation signal; and a power driver for receiving said pulse-width-modulation signal and providing a current signal for illuminating a dashboard light of said vehicle.

2. The circuit of claim 1, wherein said power driver includes a high current, low on-resistance MOSFET for minimizing heat generated and reducing the need for a heat sink for the dashboard light circuit.

3. The circuit of claim 1, wherein said power signal is a step function voltage signal.

4. The circuit of claim 1, wherein said oscillator includes a first op-amp.

5. The circuit of claim 1, wherein said oscillator includes a first op-amp and a resistor and a capacitor in series for feeding back said oscillating signal to an inverting terminal of said op-amp for producing said oscillating signal.

6. The circuit of claim 1, wherein said oscillator includes a first op-amp and a resistor and capacitor in series for feeding back said oscillating signal to an inverting terminal of said op-amp for producing said oscillating signal and establishing a frequency of said oscillating signal and said level comparator includes a second op-amp for comparing said oscillating signal to said voltage reference which voltage reference is variable and selectable through the potentiometer accessible from within the passenger compartment of said automobile.

7. The circuit of claim 1, wherein said level comparator includes a first op-amp for comparing said oscillating signal to said voltage reference which voltage reference is variable and selectable through the potentiometer electrically variable from within the passenger compartment of said automobile.

8. The circuit of claim 1, wherein said circuit is mounted in a single integrated chip.

9. The circuit of claim 1, wherein said power driver includes an E rated MOSFET responsive to said pulse-width-modulation signal for providing said current signal to said dashboard light.

* * * * *